July 8, 1941.  L. B. GLASER ET AL  2,248,678
TUNING DEVICE FOR RADIO RECEIVERS OR THE LIKE
Filed Aug. 6, 1936  9 Sheets-Sheet 1

Inventors
Leo. B. Glaser
John M. Bowman
Joseph A. Briggs
by their Attorneys
Howson & Howson July 8, 1941.   L. B. GLASER ET AL   2,248,678
TUNING DEVICE FOR RADIO RECEIVERS OR THE LIKE
Filed Aug. 6, 1936   9 Sheets-Sheet 2

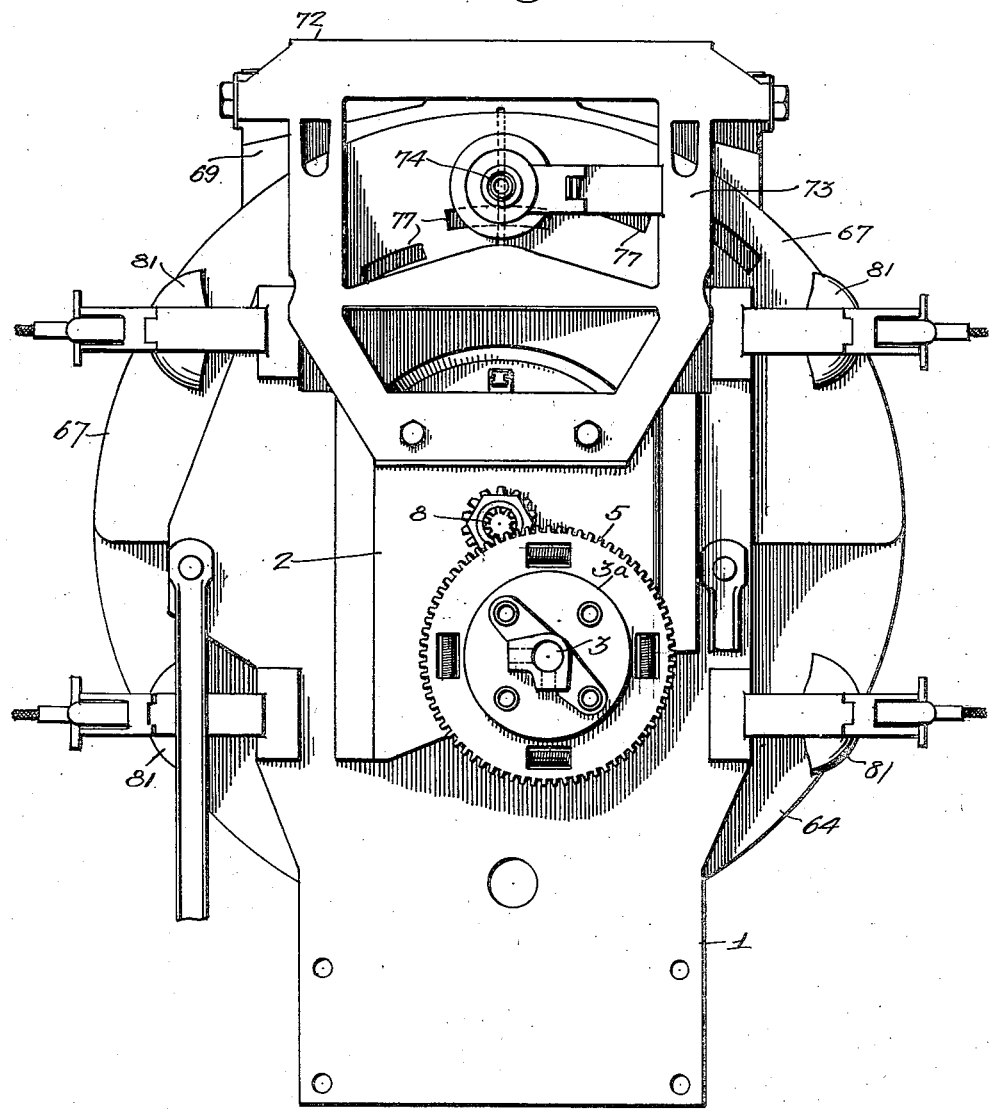

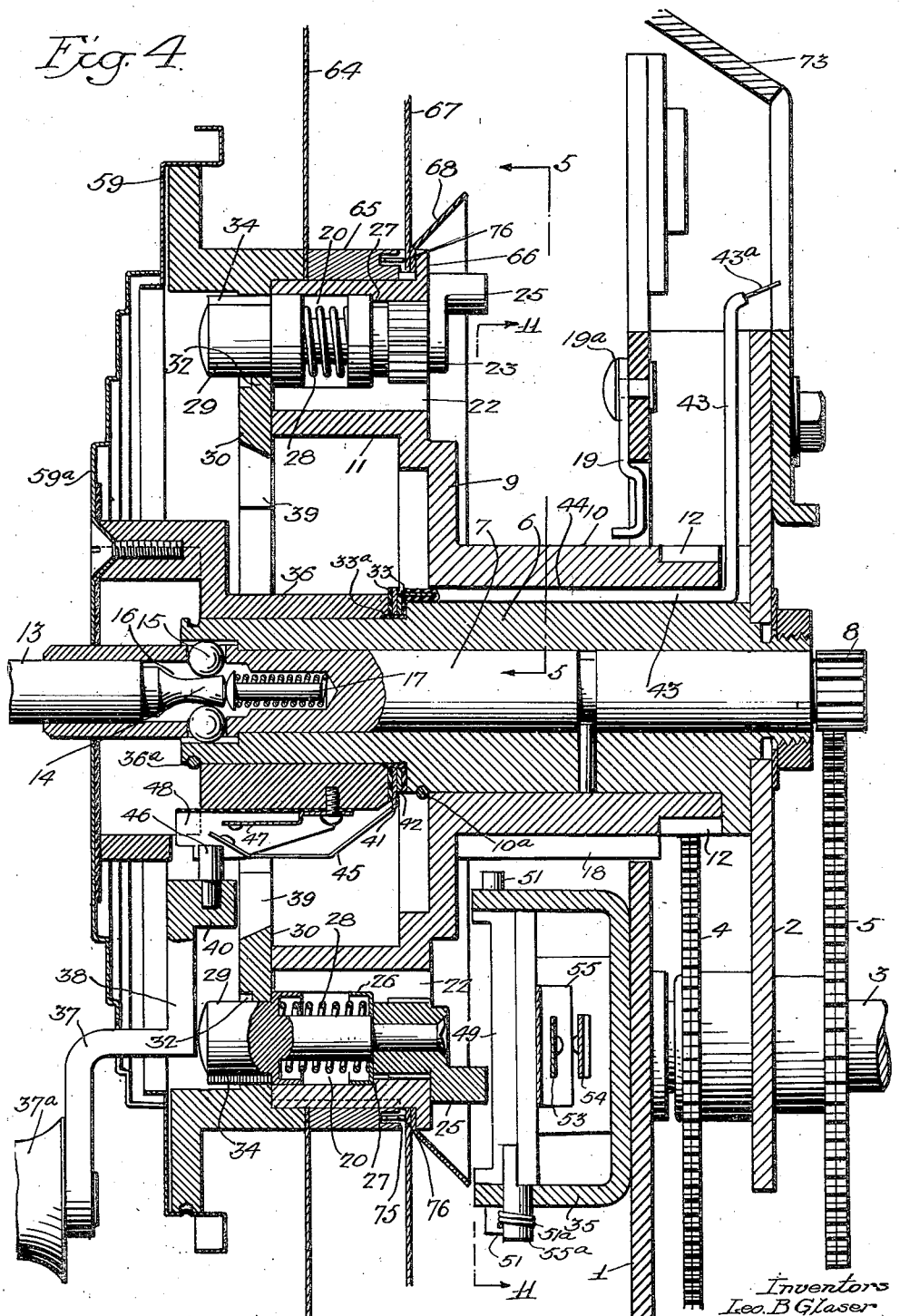

July 8, 1941.   L. B. GLASER ET AL   2,248,678
TUNING DEVICE FOR RADIO RECEIVERS OR THE LIKE
Filed Aug. 6, 1936   9 Sheets-Sheet 5
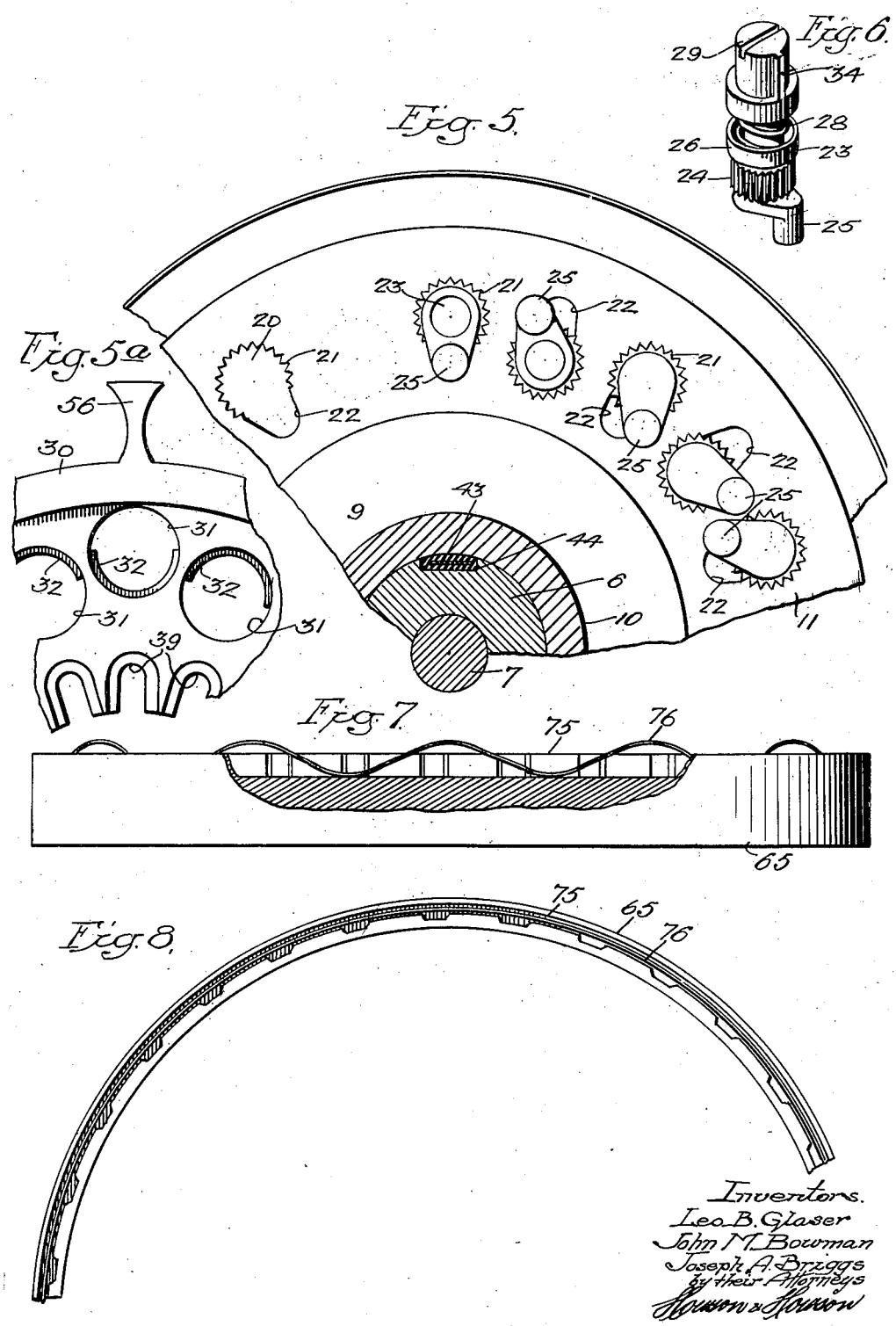

July 8, 1941.  L. B. GLASER ET AL  2,248,678
TUNING DEVICE FOR RADIO RECEIVERS OR THE LIKE
Filed Aug. 6, 1936  9 Sheets-Sheet 6
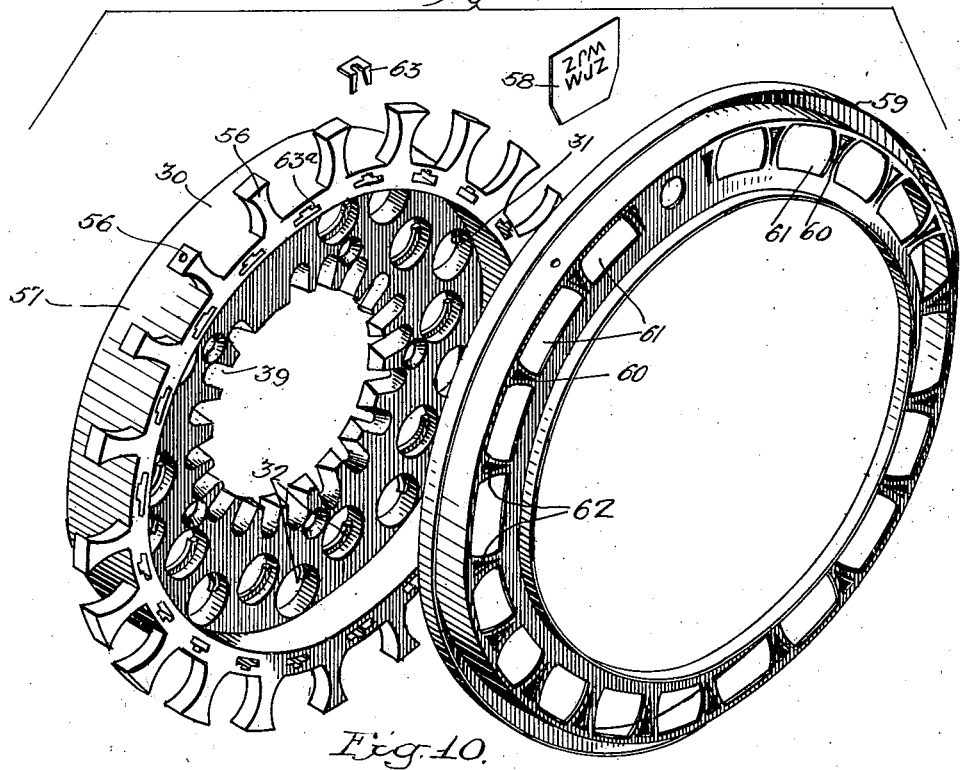
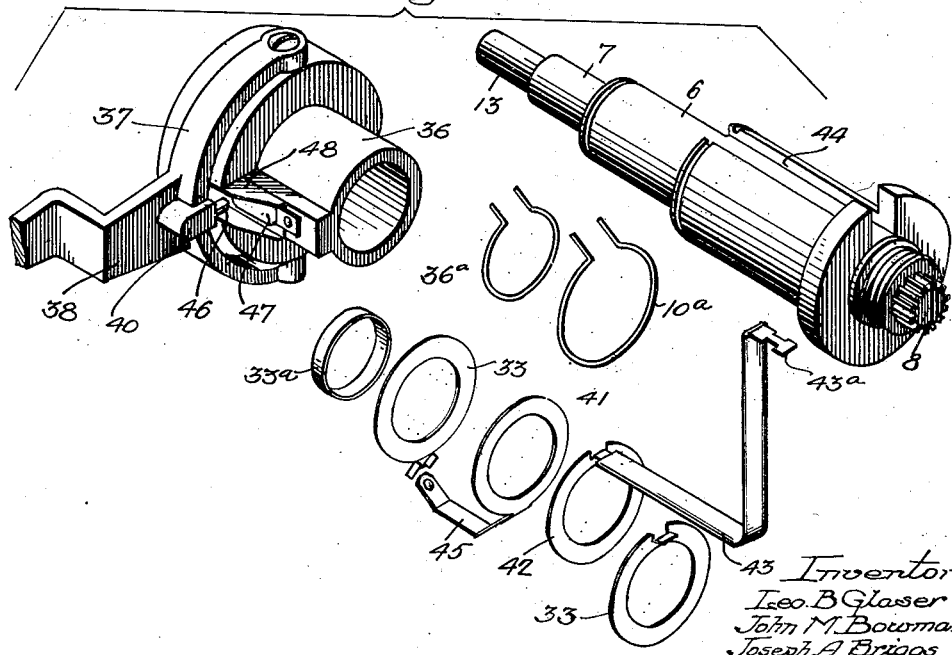

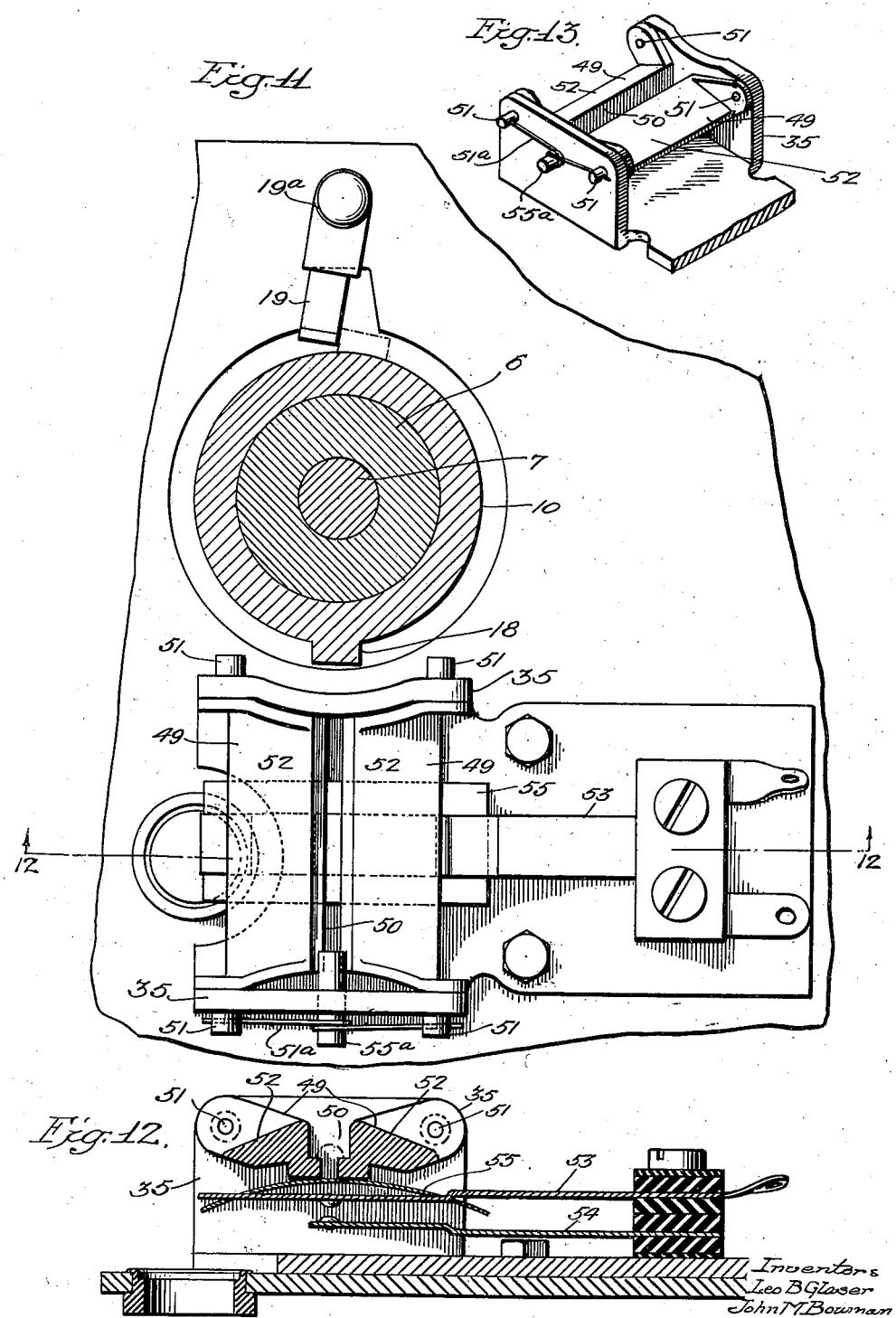

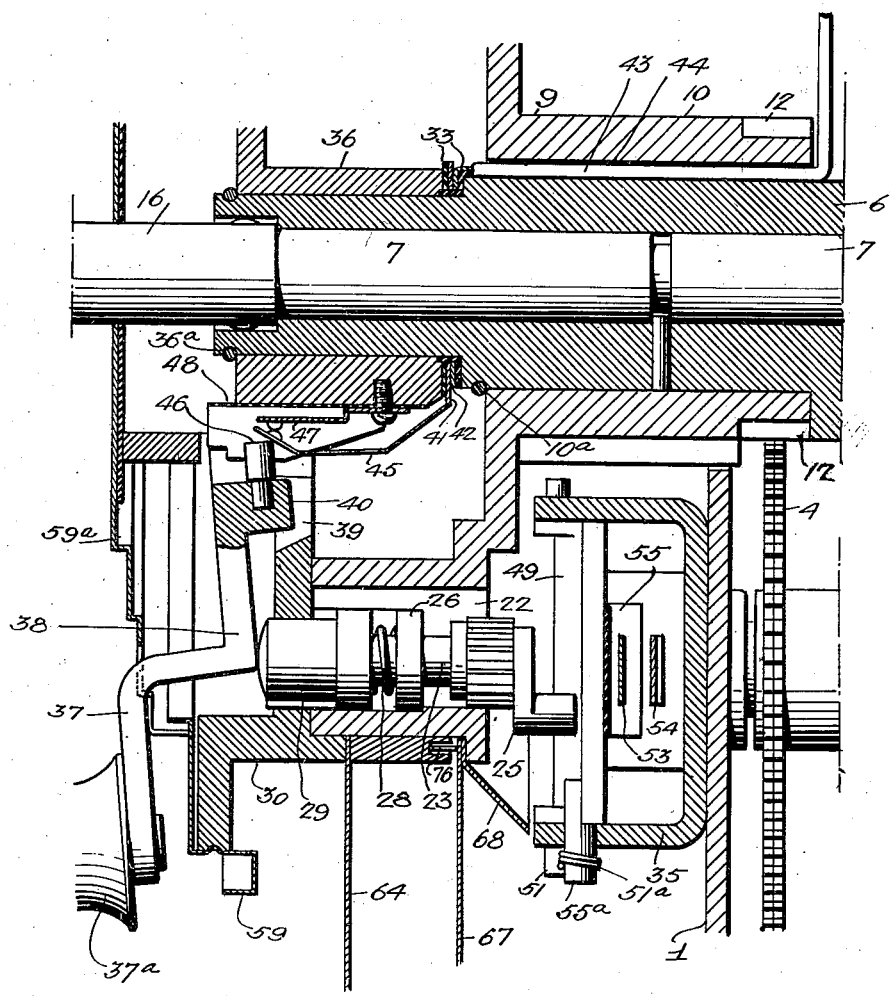

July 8, 1941.  L. B. GLASER ET AL  2,248,678
TUNING DEVICE FOR RADIO RECEIVERS OR THE LIKE
Filed Aug. 6, 1936  9 Sheets-Sheet 9
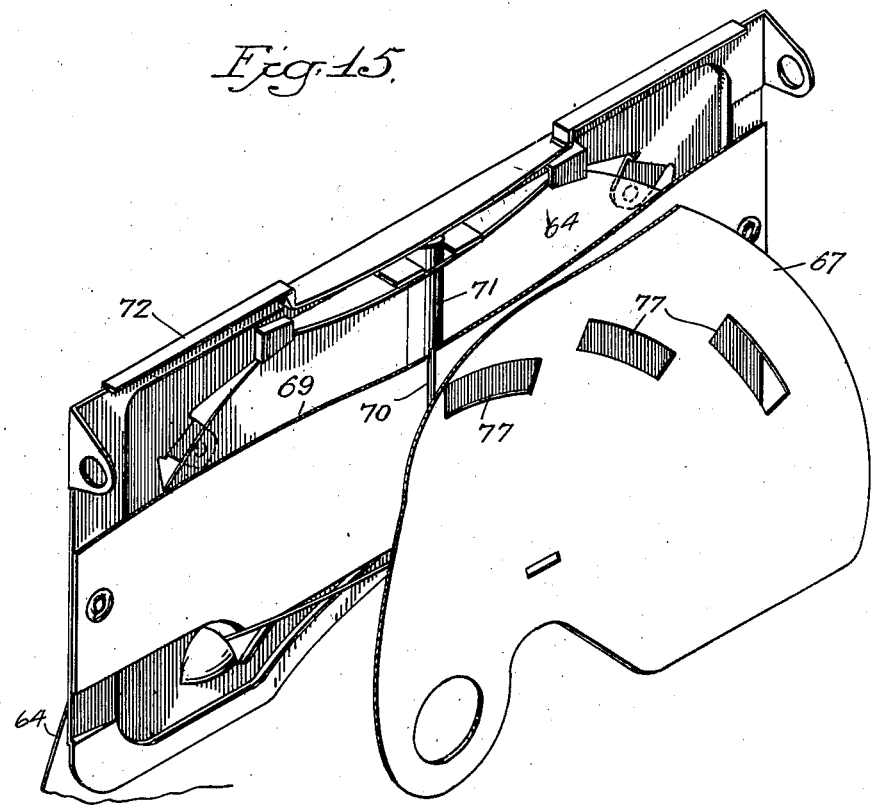
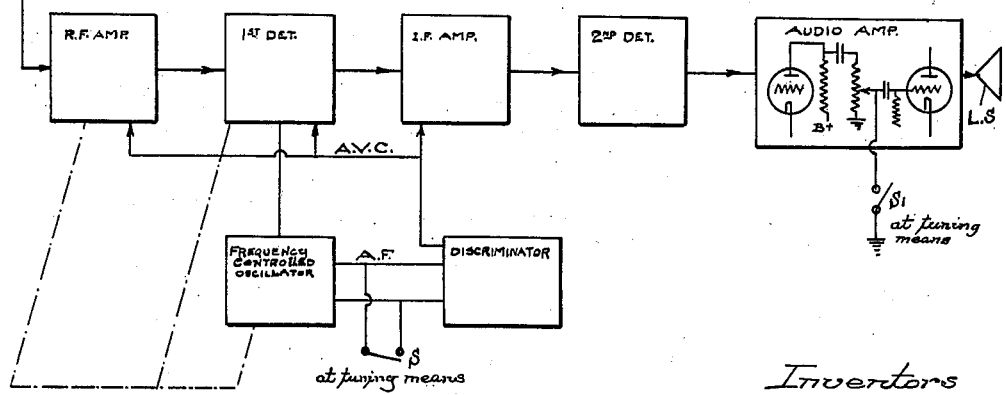
Inventors
Leo B. Glaser
John M. Bowman
Joseph A. Briggs
by their Attorneys Patented July 8, 1941

2,248,678

UNITED STATES PATENT OFFICE 2,248,678

TUNING DEVICE FOR RADIO RECEIVERS OR THE LIKE

Leo B. Glaser, Drexel Hill, and John M. Bowman, Philadelphia, Pa., and Joseph A. Briggs, Erlton, N. J., assignors, by mesne assignments, to Philco Radio and Television Corporation, Philadelphia, Pa., a corporation of Delaware Application August 6, 1936, Serial No. 94,674

26 Claims. (Cl. 250—20)

This invention relates to tuning devices for radio receivers or the like and, more particularly, to a novel tuning device for use in conjunction with a superheterodyne radio receiver employing a frequency-controlled oscillator.

One object of the invention is to provide a novel radio tuning device by means of which a radio receiver may be tuned readily to a desired broadcasting station by the simple process of moving a rotatable and depressible arm to select a station and to move the tuning element or elements of the receiver to a position corresponding to said station, the said arm being stopped automatically by a stop mechanism. More specifically, the device comprises a rotatable member carrying a plurality of selectable plunger-like elements which are generally circularly arranged and adapted to be selectively engaged by a radially-extending rotatable arm, the said arm being adapted also to actuate the said member so that rotation of the arm causes rotation of the said member until the selected element is brought into engagement with a stop mechanism. The member which is thus rotated serves to actuate the tuning element or elements of the radio receiver, and each of the selectable elements corresponds to a predetermined position of the tuning element. Thus, by selecting a particular element and rotating the arm as above mentioned, the tuning element of the receiver is moved to a position corresponding to the station desired.

Another object of the invention is to provide a device of this character wherein the said selectable elements are individually adjustable in a simple manner from the front of the radio cabinet to cause the said elements to correspond respectively to different stations.

Still another object of the invention is to provide a radio tuning device which may be manufactured economically and assembled easily and which embodies the several features described in detail hereinafter and set forth in the appended claims. The invention may be clearly understood by reference to the accompanying drawings illustrating a preferred embodiment.

In the drawings:

Fig. 3 is a rear view of the device;

Fig. 4 is a fragmentary sectional view taken along line 4—4 of Fig. 1;

Fig. 5 is a fragmentary sectional view taken along line 5—5 of Fig. 4;

Fig. 5a is a fragmentary face view of one of the parts, showing certain details;

Fig. 6 is a perspective view of one of the plunger-like elements of the device;

Fig. 7 is a side view of one of the parts with a portion broken away and shown in section for the purpose of illustration;

Fig. 8 is a partial face view of the same part;

Fig. 9 is an exploded view of the indicia plate-holding assembly illustrating also certain details of the device;

Fig. 10 is an exploded view of certain associated parts including the manually operable rotor and the switch elements associated therewith;

Fig. 11 is a fragmentary sectional view taken along line 11—11 of Fig. 4;

Fig. 12 is a fragmentary sectional view taken along line 12—12 of Fig. 11;

Fig. 13 is a perspective view of the stop mechanism;

Fig. 14 is a fragmentary sectional view similar to Fig. 4 illustrating certain parts in cooperating operative position;

Fig. 15 is a fragmentary perspective view illustrating certain parts of the tuning indicator and their cooperative relation; and Fig. 16 is a diagrammatic illustration of a radio receiver with which the device may be used.

Figure 1:
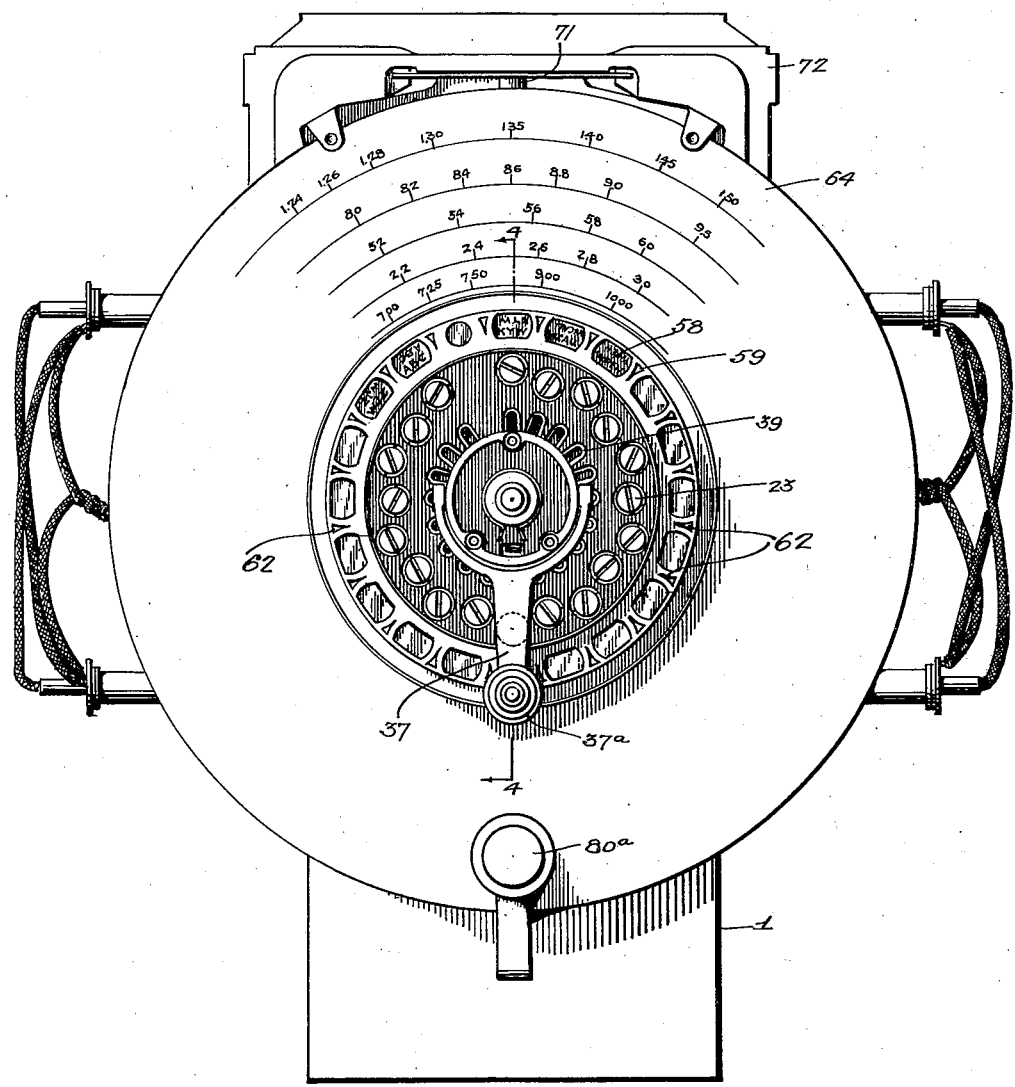
Fig. 1 is a face view of the device with the central cover plate removed for the sake of illustration.

Referring to the drawings, and particularly to Figs. 1 to 4, the device as illustrated comprises a supporting plate 1 which is adapted to be secured in position on the receiver chassis within a radio receiver cabinet or the like. This plate carries an auxiliary support 2 which, together with the plate 1, serves to rotatably support the end portion of a shaft 3, the purpose of which is to rotate the tuning element or elements of the radio receiver with which the device is associated. In other words, the shaft 3 serves to actuate the variable tuning condensers or other tuning elements of the conventional receiver, thereby tuning the receiver to a desired broadcasting station. The shaft 3 is preferably connected to the tuning elements or condensers by a flexible coupling 3a to prevent microphonic action. The shaft 3 carries gears 4 and 5, the functions of which will be apparent presently. These gears are preferably of the type known as anti-backlash gears.

A hollow stud 6 (see Fig. 4) is secured to the supporting structure as illustrated, and within this hollow stud there is rotatably mounted a shaft 7 carrying a small gear 8 at its rear end, which gear meshes with the gear 5. The stud 6 also carries a rotatable member 9 having a cylindrical hub portion 10 snugly encircling the stud 6 and a cup-shaped or recessed forward portion 11, which will be discussed later. The member 9 is rotatably secured in place upon the stud 6 by means of a resilient ring or key 10a (see Figs. 4 and 10) which seats in a recess in stud 6. The end of the portion 10 is provided with gear teeth 12 which mesh with the gear 4. It will be seen, therefore, that rotation of the shaft 7 will cause rotation of the shaft 3 through the medium of gears 5 and 8, while rotation of the member 9 will, likewise, cause rotation of shaft 3 through the medium of gears 4 and 12.

The shaft 7 may be rotated directly by means of a control knob 7a (see Figs. 2 and 4) mounted on the forward end of the shaft or it may be rotated indirectly at a slower speed by means of the auxiliary shaft 13 carrying knob 13a, which provides for fine or vernier adjustments of the tuning element of the receiver. To this end, the forward end of the shaft 7 is recessed, as illustrated in Fig. 4, to receive the shaft 13, the end of which is shaped to provide the conical head 14 engaged by balls 15 seated in apertures in the hollow portion 16 of shaft 7. A spring-pressed element 17 is arranged as shown to exert pressure axially upon the end of the head 14, thus maintaining the conical head in frictional engagement with the balls 15. It will be seen that rotation of the shaft 13 will cause slower rotation of shaft 7 through the medium of the frictional drive comprising the head 14 and balls 15.

Regardless of how the shaft 3 is rotated, the member 9 will be rotated because of the constant meshing of the gears above mentioned. A stop 18 extending longitudinally of the cylindrical portion 10 is adapted to engage a stop 19 (see Figs. 4 and 11) carried by the supporting plate 1, thus limiting the rotation of the parts in either direction. As shown in Fig. 11, the stop 19 is pivoted so that it may swing through a limited arc. This arrangement permits rotation of member 9 through substantially 360°. The stop 19 may be pivotally held by a rivet and spring washer 19a which serves to prevent the stop from rattling.

The portion 11 of member 9 is provided with circularly arranged openings 20 which are staggered, as shown clearly in Fig. 5, for a purpose which will appear later. Each of these openings is provided at one end with internal teeth or serrations 21 and each opening has an extending recess 22. The openings are so formed that the extending recesses 22 of alternate openings extend radially inward, while the recesses of the other alternate openings extending radially outward (see Fig. 5). Each of the openings 20 is adapted to receive a plunger-like element 23. Each of these plunger-like elements has a serrated portion 24 (see Fig. 6) corresponding to the serrations 21 of the openings 20, so that the plunger-like elements may be seated in the said openings in various rotary positions, and when the teeth or serrations 21 and 24 are brought into mesh by the sliding of one of the elements 23 into one of the openings 20, the said element is locked against rotation relative to the supporting member 9. Adjacent the serrated portion 24 of each element 23, there is provided a crank-like arm 25, the purpose of which will appear later. The recesses 22 of the openings 20 serve to accommodate the crank-like arms 25 so that the plunger-like elements may be inserted into the openings 20 from the front of the member 9. Each of the elements 23 carries a movable cup-shaped collar 26 which seats against an internal shoulder 27 (see Fig. 4) within the opening 20. A spring 28 associated with each of the plunger-like elements 23 serves to urge the said element forwardly with its head 29 projecting forwardly from the member 9 and through a cover plate 30 mounted upon the portion 11 of member 9 and secured thereto in suitable manner, for example, by screws.

As may be seen in Fig. 4, the plunger-like elements 23 may be formed and assembled by providing two parts, one of which is in the form of a collar having the arm 25 integral therewith and adapted to fit over a reduced and keyed end portion of the other part, after which the said end is spread in rivet fashion to hold the parts together. Prior to this assembly the two parts, the cup-shaped collar 26 and associated spring 28, may be placed upon the said other part. In this manner, the elements 23 may be easily formed and assembled.

The openings 31 in plate 30 (see Figs. 5a and 9) through which the head of the plunger-like elements extend, are each provided with a semi-circular lip 32 which serves in conjunction with a projection 34 (see Fig. 6) on the head 29, to limit rotation of the element 23. Referring again to Fig. 4, the lip 32 is aligned with the corresponding recess 22, and the projection 34 is aligned with the arm 25, so that the element 23, when in place in the assembled device, cannot be rotated to such position that the arm 25 coincides with the recess 22. In other words, when the device is assembled, the plunger-like elements 23 are inserted in the openings 20 by aligning the arms 25 with the recesses 22, and then the said elements are rotated to move the arms 25 out of alignment with the recesses 22. The cover plate 30 is then mounted in place and thereafter the elements 23 cannot be moved without removing the cover plate 30, since the lips 32 and projections 34 prevent rotation of elements 23 to positions such that the arms 25 would align with recesses 22.

As may be seen in Figs. 4, 5 and 6, if one of the plunger-like elements 23 is pressed inwardly to its innermost position, the serrations or teeth 24 are moved axially inward until they clear the serrations 21, thus permitting the element 23 to be rotated to a desired position, after which the element may be released to allow the complementary teeth or serrations to re-engage, thus locking the element in the desired position against rotation relative to the supporting member 9. In this manner, the arm 25 of each element may be adjusted accurately through a semi-circle to position the end of each arm in any desired position within the range of adjustment thereof. By virtue of the construction above described, adjacent arms of the elements 23 are adjustable through opposed semi-circles, or in other words, alternate arms of the said elements are adjustable through similar semi-circles. This structure, together with the staggered arrangement of the elements 23 in the staggered openings 20, permits adjustment of the elements 23 throughout the entire annular area in which they are disposed. For example, as shown at the right of Fig. 5, two adjacent elements 23 may be so adjusted that their arms 25 are closely adjacent one another and yet not interfere one with another. The positions of the arms 25 in any instance correspond respectively to positions of the tuning element of the receiver and to positions of the tuning indicator dial, and by virtue of the close adjustment of one arm with respect to an adjacent arm, which is made possible by the specific structure employed, the device may be adjusted to tune the receiver to closely adjacent stations in the frequency band or bands for which the receiver is adapted. The heads of the elements 23 are slotted as shown in Fig. 6, so that a simple tool, such as a screw driver, may be employed to adjust the said elements. Thus, in order to adjust any one of the elements, a screw driver may be inserted in the slotted head of that element and pressure applied to cause disengagement of the serrations or teeth as above mentioned, and then the screw driver may be rotated to rotate the element to the desired position, after which the element may be released to allow the spring 28 to urge it into locking position. It will be noted that the use of the complementary serrations or teeth permit accurate rotary adjustment of the elements 23.

A stop mechanism 35, which will be described later, is carried by the supporting plate 1 (see Figs. 4 and 14) and is adapted to cooperate with the elements 23. In their normal outward positions, the elements 23 clear the stop mechanism when the member 9 is rotated, but when a selected one of the elements 23 is moved inward slightly, the end of the arm 25 of such element engages the stop mechanism 35 to interrupt the rotation of member 9. This inward movement of a selected element 23 is insufficient to cause disengagement of the teeth or serrations 21 and 24, so that the selected element maintains its interlocked condition with respect to member 9.

A rotor in the form of a sleeve or collar 36 is rotatably mounted upon the forward portion of the hollow stud 6 within the cup-shaped portion 11 of member 9. The collar 36 is held in place by a resilient ring or key 36a which seats in a groove in stud 6 (see Fig. 10). This collar carries a pivoted arm 37 having a knob 37a, which arm is thus adapted to rotate collar 36 and is depressible axially of the device, as shown in Figs. 4 and 14. The arm 37 is formed as illustrated to provide a portion 38 which is adapted to engage the head of a selected one of the plunger-like elements 23. Thus, the arm 37 may be rotated to bring the portion 38 into alignment with any one of the elements 23 and when the arm is depressed, the selected element is moved inwardly, so that it may be brought into engagement with the stop mechanism 35, as above mentioned. The plate 30 is provided with recesses 39 (see Fig. 9) which are aligned radially with the openings 31 and with the elements 23. Recesses 39 are adapted to receive a projection or nub 40 provided on the arm 37. When the arm is depressed to engage one of the elements 23, the projection 40 enters the corresponding recess 39, thus interlocking the arm 37 with the plate 30 and with the member 9 to which plate 30 is attached. Preferably, the recesses 39 have sloping sides so that the projection 40 may enter a recess and be brought into position, even though the two are slightly misaligned in some instances. Therefore, if the arm 37 is rotated while it is depressed, it rotates the member 9 at the same time that it holds the selected element 23 in depressed position. In this manner, the selected element may be brought into engagement with the stop mechanism 35.

Referring to Figs. 4 and 10, between the inner end of collar 36 and a shoulder on stud 6, there are mounted electrically conductive rings 41 and 42 which engage one another and which are insulated from the other parts by insulating spacers 33 and 33a. The ring 42 has an extending arm 43 (see Fig. 10), which arm is enclosed in insulating material and is seated in a longitudinal recess 44 provided in the stud 6, as clearly shown in Figs. 4 and 5. The arm 43 terminates in a terminal portion 43a to which electrical connections may be made from the radio receiver, as described hereinafter. The ring 41 also carries an extending resilient arm 45, the end of which is disposed in cooperative relation with an insulating pin 46 carried by the arm 37. The arm 45, together with an arm 47, carried by collar 36 and attached thereto, provide a switch which is adapted for actuation by the pin 46, the ends of the arms 45 and 47 carrying cooperating contacts, as clearly shown in Fig. 4. The arm 47 is disposed within a channel member 48 formed of insulating material and the end of arm 45 also extends within the said channel. This channel member prevents contact of the arms with the other parts. In addition to serving as a switch element, the arm 45, by virtue of its resilience, serves as a spring to urge the arm 37 to its outward position. In other words, the radial pressure exerted upon pin 46 by the arm 45 maintains the arm 37 in its outward position free of the elements 23, so that the arm may be rotated freely, as described hereinafter. During rotation of collar 36 by arm 37, the ring 41 slides upon the ring 42 and maintains electrical contact therewith so that the two rings serve as slip rings to maintain an electrical connection between the arms 43 and 45 at all times. The arm 47 is connected electrically to collar 36 and is, therefore, connected electrically to supporting plate 1 through the medium of the electrically conductive stud 6. Since the support 1 will be grounded, the switch 45, 47 serves to complete a circuit to ground from arm 43. It will be noted that this circuit is completed during rotation of arm 37 in its depressed position or, in other words, during tuning of the receiver, as will be clearly understood later.

Referring to Figs. 11, 12, 13 and 14, the stop mechanism 35 comprises a pair of similar gate members 49 having a space 50 therebetween into which space the projecting end of the arm 25 of a selected element 23 may be moved. The gate members are pivoted at 51 and these members are formed so as to provide cam surfaces 52, either of which is engageable by the arm 25 of a selected element 23, depending upon the direction of rotation of the said arm. When the arm engages the cam surface 52 of one of the gate members, it rides along the cam surface, moving the gate member pivotally until the arm is disposed within the space 50, at which time the depressed gate member is permitted to return to its normal position. When the arm 25 enters the space 50, it abuts against the other gate member and is stopped, and when the two gate members are again in normal position, the arm is disposed between them. Thus, the position of the member 9 and, therefore, the position of the tuning element of the receiver, is accurately fixed during a tuning operation by the locking of the arm 25 between the gate members. When the selected element 23 is released, of course, the end of the arm 25 moves out of the space 50 so that the device is conditioned for subsequent tuning operations.

It is important to note that the gate members 49 are pivoted at their forward outward positions, as may be seen in Figs. 12 and 13, so that they are adapted to swing in arcs away from the defined space 50 and, therefore, do not interfere with the movement of an arm 25 into the said space. By this construction, it is possible to make the space 50 of a width corresponding accurately with the diameter of the end of each arm 25, thereby causing the arm to be locked in one position when it is moved into the space 50. This is an important feature which greatly enhances the accuracy of the device. If the gates were pivoted at their rear outer portions, they would move through the space 50 and in order to accommodate the end of an arm 25, it would be necessary to make the space 50 substantially larger than the diameter of the said end. This would permit considerable movement of the arm 50 while in locked position, thus decreasing the accuracy of the device. It will be seen, therefore, that the manner of pivotally mounting the gates is very important.

The gate members 49 are also adapted to actuate a switch comprising resilient arms 53 and 54, as shown clearly in Fig. 12. Resilient arm 53 carries an insulating element 55 which serves to maintain the gates in their normal closed position against stop 55a (see Fig. 11), thus acting as a spring for this purpose. The arm 53 may be assisted in its function of keeping the gate closed by the use of an additional spring 51a which is held by stop 55a and passes through slots in the pivots 51. When either of the gate members is actuated, it moves the resilient arm 53 toward arm 54, bringing the cooperating contacts carried by the said arms into engagement and thus closing the switch momentarily during the short interval required for the end of an arm 25 to move into the space 50. As soon as the depressed gate member is released, the switch is allowed to open. Thus, the switch is closed momentarily just prior to completion of the tuning adjustment. It will be noted that both arms 53 and 54 are insulated from the chassis. The purpose of this switch member will be described later.

The plate 30 is formed to provide spaced radial projections 56 (see Fig. 9) at its peripheral portion with spaces 57 therebetween. The projections 56 serve to support transparent indicia plates 58, each plate being bridged between two adjacent projections. A cooperating retainer ring 59 frictionally engages the ends of projections 56 and serves to hold the indicia plates in position. This retainer ring is provided with radial portions 60 coinciding with the projections 56 and having spaces 61 coinciding with spaces 57 to accommodate the indicia plates. The radial portions 60 of the retainer plate are provided with inwardly struck detents 62 which serve to maintain the indicia plates in proper spaced relation. A plurality of spring elements 63 corresponding respectively to the indicia plates are seated in recesses 63a in the outer face of the plate 30 and serve to press the indicia plates against the retainer ring, thus holding the indicia plates securely. By this construction, the indicia plates may be readily removed or inserted by sliding them radially inward or outward between the plate 30 and the retainer ring and, at the same time, they are held securely when in place. Each of the indicia plates may carry an inscription or indicia which identifies a particular station or signal channel. Since these plates are radially aligned respectively with respect to the elements 23, a particular element may be selected corresponding to a desired station by rotating the arm 37 until it aligns with the particular indicia plate. It will be understood, of course, that the device will have been so adjusted that when an element 23 corresponding to a particular indicia plate is disposed in the space 50 between the gate members 49, the receiver will be tuned to the station indicated by that indicia plate.

A cover plate 59a (see Fig. 4) is secured to the rotor 36 and rotates with the same, the said cover plate being cut away to accommodate the arm 37. The cover plate covers the central front portion of the device including the heads of elements 23. This plate may be readily removed when it is desired to adjust the elements 23 as above described.

A transparent indicating dial member 64 is carried by member 9 and keyed thereto. The dial is securely held by a ring 65 (see Fig. 4) cooperating with the plate 30. The ring 65 also serves cooperatively with a flange 66 on member 9 to support a rotatable translucent plate or screen 67 and an annular reflector 68 disposed at an angle with respect to the screen 67, as illustrated, and having its surface adjacent the screen of light-diffusing character. The purpose of these elements will appear presently. The dial 64 is provided with graduations or indicia indicating various frequencies of the transmitting stations within the frequency band or bands for which the receiver is adapted. Preferably, the device is adapted for use with a multi-band radio receiver, that is, a receiver adapted to receive signals from stations whose transmitting frequencies lie in a plurality of different frequency bands. Therefore, the dial 64 is preferably provided with a plurality of different sets of indicia corresponding respectively to the different bands and displaced radially from one another upon the dial, as shown in Fig. 1.

Associated with the dial 64, there is provided a tuning indicator mechanism of the type disclosed and claimed in the copending application of Joseph A. Briggs, Serial No. 76,669, filed April 27, 1936, Patent No. 2,069,131, issued January 26, 1937. This indicator mechanism comprises a translucent plate or screen 69 (see Fig. 15) disposed between the dial 64 and the screen 67 adjacent the indicia of the dial and having an elongated area 70 of different light-transmitting character from the rest of the screen, which area may comprise simply an elongated aperture or slot. In the case of a multi-band tuning device, the elongated area or aperture 70 should, of course, be of sufficient length to align with the several sets of graduations on dial 64. Between the dial 64 and the screen 69, and aligned with the aperture 70, there is provided a cylindrical light-transparent member 71, which member may comprise a piece of glass rod. The screen 69 and the transparent member 71 are carried by a supporting frame 72 which in turn is carried by bracket 73 mounted upon the support 2 (see Fig. 2). Behind the screen 67, there is provided a light source 74 also carried by the bracket 73. This light source projects light through the translucent screens 67 and 69 and through the translucent dial 64, the elongated area or slot 70 forming a stationary light image upon the dial with which the indicia on the rotatable dial 64 may be brought into coincidence. The transparent member 71 serves to define the image more sharply, as described more fully in the said copending Briggs application.

For use in multi-band receivers of the type above mentioned, the translucent screen 67 is provided between the translucent screen 69 and the light source 74, as above mentioned. The screen 67 is rotatably supported in the manner illustrated in Fig. 4. To this end, the ring 65 is provided with a circumferential groove or recess 75 (see Figs. 7 and 8) within which there is disposed a spring member 76. The spring member is seated in the groove and bears against the inner peripheral edge portion of the screen 67. In this manner, the screen 67 is held rigid by the frictional engagement of spring 76 and, at the same time, the screen is permitted to rotate relative to the other parts associated with them. The screen 67 is provided with arcuate openings 77, as shown in Fig. 15, which are arranged cooperatively with the respective sets of graduations upon the dial 64. As stated above, the concentric sets of indicia or graduations upon dial 64 designate different wave bands or frequency bands to which the radio receiver is receptive. Although the screen 67 is broken away in Fig. 15 for clarity of illustration, there will be an aperture 77 for each of the different sets of indicia on dial 64. It will be seen that the apertures 77 are spaced from one another angularly and also radially, the radiant spacing of these apertures corresponding to the radial spacing of the sets of indicia on dial 64. Therefore, by rotating the screen 67, any desired one of the apertures 77 may be brought into position behind the elongated slot 70 for use in conjunction with the corresponding set of indicia on dial 64, when it is desired to operate the receiver to receive broadcast signals within a particular frequency range or wave band. The aperture 77 which is thus positioned behind the elongated slot 70 defines a background area for the above-mentioned image, which area is more brilliantly illuminated than the remaining background area and stands out in contrast therewith but is less brilliantly illuminated than the image formed by slot 70. Moreover, the aperture 77 serves to confine the indicating image to the particular set of indicia on dial 64 being used in the particular instance.

The screen 67 has connected thereto a link 78 (see Fig. 2), the lower end of which is connected by a crank arm 79 to the front end of a rotatable shaft 80 which serves to actuate the wave band switch that is commonly employed in multi-band radio receivers, as well understood in the art. Since this switch is a conventional element of the multi-band receiver, it is sufficient to note here that it adapts the radio receiver for reception in any one of the several frequency bands or wave bands when the shaft 80 is rotated. This shaft is manually operable by means of the control knob 80a. It will be seen that rotation of the shaft 80 by means of knob 80a, in addition to actuating the wave band switch, rotates the screen 67 through the medium of the crank arm 79 and the link 78, the parts being so arranged or designed that the aperture 77 corresponding to a particular position of the wave band switch is brought into position behind the slot 70 when the switch is actuated to its said position.

The translucent members 64, 67 and 69 may be formed of any suitable translucent material, such as that of which the translucent dials of tuning devices for radio receivers are commonly made. These members may be readily cut or stamped from sheets of material, as will be well understood. As stated above, the cylindrical member 71 may be formed of glass rod and may be simply cut from a length of rod of the desired diameter.

Figure 2:
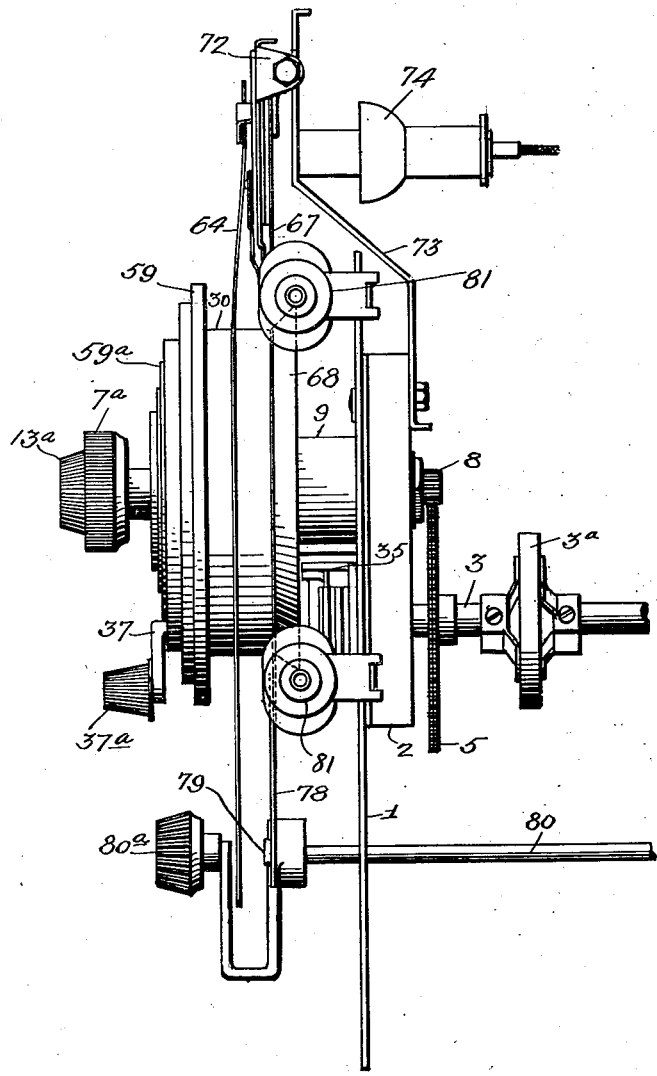
Fig. 2 is a side elevational view of the device.

As shown more clearly in Figs. 2 and 3, a plurality of light sources 81 are carried by the supporting plate 1 and are arranged to project light onto the reflecting surface of the reflector 68. These light sources are spaced circumferentially about the device in substantial alignment with the reflector 68 and, while there are four of these light sources shown, it will be understood that any suitable number may be provided. Each of these light sources is provided with a reflector which is so shaped as to concentrate the light from the light source upon the reflecting surface of the reflector 68. The reflector directs the light onto the rear side of the translucent screen 67 and the light passes through this screen as well as through the dial 64 and the indicia plates 58. In passing through the several translucent members, the light is evenly diffused and distributed so that the indicia plates 58 are evenly illuminated.

In Fig. 16, there is illustrated diagrammatically a conventional superheterodyne radio receiver embodying certain features which are adapted for use in conjunction with the tuning device above described. As is well known and as indicated in Fig. 16, such a receiver comprises an antenna A, a radio frequency amplifier supplied with incoming signals by the antenna, a first detector in which the amplified signal is heterodyned with a locally generated signal, an intermediate frequency amplifier, a second detector in which the I. F. signal is demodulated, an audio frequency amplifier in which the demodulated or audio signal is amplified, and a loud speaker L. S. which reproduces the audio signal. In the particular receiver illustrated, the oscillator, which produces the locally generated signal, has its frequency controlled accurately by a discriminator which is supplied with intermediate frequency signal energy from the I. F. amplifier, as disclosed and claimed in the copending application of Charles Travis, Serial No. 93,732, filed July 31, 1936. The discriminator, in addition to supplying the automatic frequency control (A. F. C.) signal, also supplies an automatic volume control (A. V. C.) signal which is applied to certain parts of the system, as well understood. The present invention is not concerned with the details of this specific system which forms the subject matter of the said Travis application. For the present purpose, it is sufficient to state that this system controls the frequency of the oscillator in accordance with the received and selected signal in such manner that mistuning of the radio receiver by some small amount causes the discriminator to generate a control voltage which modifies the frequency of the oscillator in such a way as to minimize the mistuning. The several tunable units of the system may be tuned by any suitable tuning means, as indicated by the broken-line representation.

As indicated in Fig. 16 and as disclosed more fully in the said Travis application, there is provided a switch S which is adapted to be operated by the tuning means employed. As disclosed in the Travis application, this switch is connected in shunt with a condenser or condenser forming part of the discriminator, so that the switch discharges the condenser when it is closed. As pointed out in the Travis application, it is desirable that the switch be closed at some time during the tuning operation and opened as the tuning operation is being completed or thereabouts. This serves to reduce the A. F. C. bias signal to zero so that when the A. F. C. control again becomes operative, it will lock in on the intended station and not on a neighboring channel. Preferably, the switch should be closed momentarily just prior to completion of the tuning operation.

The tuning device provided by the present invention is very well adapted to serve this switch-closing function. Accordingly, the switch elements 53, 54 above mentioned may comprise the switch S and may be connected to the radio receiver, as illustrated diagrammatically in Fig. 16. As pointed out above, the switch 53, 54 is closed momentarily just prior to completion of the tuning operation and, therefore, this switch is well adapted for the particular purpose.

It is also desirable that the receiver be rendered inoperative during the entire tuning operation in order to prevent noises and reception of undesired stations during the tuning operation. This may be accomplished by short-circuiting the audio frequency portion of the receiver. As shown in Fig. 16, a switch $S_1$ may be connected to a desired portion of the audio frequency amplifier and may be grounded, so that when the switch is closed, the audio frequency amplifier is short-circuited to ground, thus rendering the receiver inoperative. The switch elements 45, 47 above described may comprise the switch $S_1$. As described above and as illustrated in Fig. 14, the arm 37 is depressed and is held in depressed position during the entire tuning operation, so that the switch elements 45, 47 are in contact with one another. By connecting the terminal 43a to the radio receiver in the manner indicated in Fig. 16, the switch 45, 47 may be made to function in the manner of the short-circuiting switch $S_1$, it being remembered that the switch element 47 is connected to ground through the parts of the tuning device.

Considering the tuning device as a whole and as associated with a radio receiver such as shown in Fig. 16, the receiver may be tuned by manipulation of knobs 7a and 13a to actuate the tuning element or elements of the radio receiver through the medium of gears 5 and 8 and the shaft 3. Accurate tuning of the receiver may be obtained in this manner by the use of the vernier control 13a. As noted above, the member 9 is rotated during such tuning through gears 4 and 12 and, therefore, the dial 64 rotates and serves cooperatively with the other elements of the tuning indicator to indicate the proper tuning. During such tuning, however, the elements 23 remain in their normal positions, since the arm 37 is outwardly disposed and none of the elements 23 comes into engagement with the stop 35. In other words, this portion of the tuning mechanism is inoperative. Such tuning corresponds to tuning with conventional devices.

Now suppose it is desired to tune the receiver rapidly and with a minimum effort to the desired station. In such case, the control knobs 7a and 13a will not be employed, but the arm 37 will be rotated by means of knob 37a to select one of the elements 23 corresponding to the desired station which is indicated by a particular indicia plate. In other words, the arm 37 is rotated until it approximately aligns with the particular indicia plate. The knob 37a is then pressed inward to depress the arm 37 and this performs the several functions above mentioned, viz., it presses the selected element 23 inward, locks the projection 40 with the particular recess 39 in plate 30 corresponding to the selected element, and closes the switch 45, 47, all of which is depicted in Fig. 14. The arm 37 in its depressed position is then rotated until the projecting end of the arm 25 of the selected element 23 locks in place in the space 50 of the stop mechanism. During the tuning, the switch 45, 47 is maintained closed as above mentioned, while the switch 53, 54 is closed momentarily during the instant that the end of the arm 25 rides over one of the cam surfaces 52 into the space 50. Thus, the switching functions above mentioned are performed. When the knob 37 is released, the switch 45, 47 opens and the receiver becomes operative. The re-opening of switch 53, 54 will have rendered the frequency-controlled oscillator operative and any possible slight mistuning of the receiver will be corrected. Thus, by means of the tuning operation just described, the receiver may be tuned quickly without recourse to the tuning indicator, thus eliminating the necessity of accurately adjusting the tuning indicator.

From the above description, it will be seen that the tuning device provided by the invention has desirable novel features which greatly enhance its performance. The design and arrangement of the elements 23 and the cooperating structure, providing wide adjustment of these elements so as to adapt the device for practically any station and enabling adjustment of these elements in a very simple manner, as above described, constitutes a very important feature of the invention. The other features above described are also important and cooperatively impart desirable characteristics to the device.

While a specific embodiment of the invention has been illustrated for the purpose of disclosure, it will be understood that the invention is capable of modification and change particularly as to the details of construction. Such changes and modifications may, therefore, be resorted to without departing from the scope of the invention.

We claim:

1. In a tuning device for a radio receiver or the like, a rotatable member adapted to rotate a tuning element of said receiver, said member having a plurality of recesses therein, a plurality of selectable elements each adapted to seat slidably in one of said recesses and each corresponding to a different position of said tuning element, said recesses and said elements having complemental interdentate surfaces for locking said elements in adjusted position, a stop mechanism adapted for cooperation with a selected one of said elements, and manually operable means for selecting one of said elements and for moving said member to bring the selected element into cooperative relation with said stop mechanism, to thereby stop said tuning element at a predetermined position corresponding to the selected element.

2. In a tuning device for a radio receiver or the like, a rotatable member adapted to rotate a tuning element of said receiver, said member having a plurality of recesses therein, a plurality of selectable elements corresponding respectively to different positions of said tuning element, each of said elements being adapted to seat slidably in one of said recesses and each having an extending arm, said recesses and said elements having complemental interdentate surfaces for locking said elements in adjusted position but permitting rotary adjustment of said elements when they are moved to non-locking position, a stop mechanism adapted for cooperation with the arm of a selected one of said elements, and manually operable means for selecting one of said elements and for moving said member to bring the arm of a selected element into cooperative relation with said stop mechanism, to thereby stop said tuning element at a predetermined position corresponding to the selected element.

3. In a tuning device for a radio receiver or the like, a rotatable member adapted to rotate a tuning element of said receiver, said member having a plurality of openings therein, a plurality of plunger-like elements seatable respectively in said openings and normally projecting therefrom, a projection on each of said elements, a plate associated with said member and having recesses to accommodate the projecting elements, a stop within each of said recesses adapted to cooperate with said projection to limit the rotary movement of each of said elements relative to said member, a stop mechanism adapted for cooperation with a selected one of said elements, and manually operable means for selecting one of said elements and for moving said member to bring the selected element into cooperative relation with said stop mechanism.

4. In a tuning device for a radio receiver or the like, a rotatable member adapted to rotate a tuning element of said receiver, said member having a plurality of openings with recesses, a plurality of plunger-like elements each adapted to seat slidably in one of said openings with an end projecting from the opening and each element having a laterally extending arm at its other end conforming with the recess of said opening, whereby each of said elements may be slidably inserted through its opening with its arm aligned with the recess and then turned to misalign the arm and recess, a projection on the projecting end of each of said element, a plate associated with said member and having recesses to accommodate the projecting ends of said elements, a stop within each of said last-named recesses adapted to cooperate with said projection to limit the rotary movement of each of said elements relative to said member and to prevent alignment of the element arm with its associated recess, a stop mechanism adapted for cooperation with the arm of a selected one of said elements, and manually operable means for selecting one of said elements and for moving said member to bring the arm of the selected element into cooperative relation with said stop mechanism.

5. In a tuning device for a radio receiver or the like, a rotatable member adapted to rotate a tuning element of said receiver, said member having a plurality of openings with recesses, a plurality of plunger-like elements each adapted to seat slidably in one of said openings with an end projecting from the opening and each element having a laterally extending arm at its other end conforming with the recess of said opening, each of said openings and its associated element having complemental interdentate surfaces for locking said element in an adjusted position but permitting rotary adjustment of the element when it is moved to its innermost position, a spring associated with each of said elements and arranged to resist movement of the element to said position and to maintain the element normally in locked position, whereby each of said elements may be slidably inserted through its opening with its arm aligned with the recess and moved slidably to its innermost position against the action of its spring and then turned to misalign the arm and recess, a projection on the projecting end of each of said element, a plate associated with said member and having recesses to accommodate the projecting ends of said elements, a stop within each of said last-named recesses adapted to cooperate with said projection to limit the rotary movement of each of said elements relative to said member and to prevent alignment of the element arm with its associated recess, a stop mechanism adapted for cooperation with the arm of a selected one of said elements, and manually operable means for selecting one of said elements and for moving said member to bring the arm of the selected element into cooperative relation with said stop mechanism.

6. In a tuning device for a radio receiver or the like, rotatable means adapted to rotate a tuning element of said receiver, a plurality of selectable spring-pressed elements carried by said means and corresponding respectively to different positions of said tuning element, a pair of individually depressible gate members with a space therebetween forming a stop mechanism adapted for cooperation with a selected one of said elements, and a manually rotatable and depressible member adapted to engage and move said means and to depress a selected one of said elements so as to bring the selected element into engagement with one of said gate members and into said space, to thereby stop said tuning element at a predetermined position corresponding to the selected element.

7. In a tuning device for a radio receiver or the like, rotatable means adapted to rotate a tuning element of said receiver, a plurality of selectable elements carried by said means and corresponding respectively to different positions of said tuning element, a pair of pivoted gate members with a space therebetween forming a stop mechanism for cooperation with a selected one of said elements, said gate members being pivoted at their front outer portions and being adapted to pivot rearwardly, and manually operable means for selecting one of said elements and for moving said rotatable means to bring the selected element into engagement with one of said gate members and into said space, to thereby stop said tuning element at a predetermined position corresponding to the selected element.

8. In a tuning device for a radio receiver or the like, a rotatable member adapted to rotate a tuning element of said receiver, a plurality of selectable elements carried by said member and corresponding respectively to different positions of said tuning element, a stop mechanism adapted for cooperation with a selected one of said elements, manually operable means for selecting one of said elements and for moving said rotatable member to bring the selected element into engagement with said stop mechanism, to thereby stop said tuning element at a predetermined position corresponding to the selected element, and a switch adapted for connection to said receiver and operable momentarily by said stop mechanism when the selected element engages the same.

9. In a tuning device for a radio receiver or the like, rotatable means adapted to rotate a tuning element of said receiver, a plurality of selectable spring-pressed elements carried by said means and corresponding respectively to different positions of said tuning element, a pair of individually depressible gate members with a space therebetween forming a stop mechanism adapted for cooperation with a selected one of said elements, a switch adapted for connection to said receiver and arranged for actuation by either of said gate members, and a manually rotatable and depressible member adapted to engage and move said means and to depress a selected one of said elements so as to bring the selected element into engagement with one of said gate members and into said space, to thereby stop said tuning element at a predetermined position corresponding to the selected element.

10. In a tuning device for a radio receiver or the like, a rotatable member adapted to rotate a tuning element of said receiver, a plurality of selectable elements carried by said member and corresponding respectively to different positions of said tuning element, a pair of individually depressible gate members with space therebetween forming a stop mechanism adapted for cooperation with a selected one of said elements, a switch adapted for connection to said receiver and arranged for actuation by either of said gate members, said switch including a resilient switch member serving to maintain said gate members normally closed, and manually operable means for selecting one of said elements and for moving said rotatable member to bring the selected element into engagement with one of said gate members and into said space, to thereby actuate said switch and stop said tuning element at a predetermined position corresponding to the selected element.

11. In a tuning device for a radio receiver or the like, rotatable means comprising a member adapted to rotate a tuning element of said receiver, a plurality of selectable spring-pressed elements carried by said means and corresponding respectively to different positions of said tuning element, a stop mechanism adapted for cooperation with a selected one of said elements, a manually operable rotor mechanism including a depressible arm adapted to engage and move said member and to depress a selected one of said elements so as to bring the selected element into cooperative relation with said stop mechanism, and a switch adapted for connection to said receiver and carried by said rotor mechanism so as to be actuatable by said depressible arm.

12. In a tuning device for a radio receiver or the like, rotatable means comprising a member adapted to rotate a tuning element of said receiver, a plurality of selectable spring-pressed elements carried by said means and corresponding respectively to different positions of said tuning element, a stop mechanism adapted for cooperation with a selected one of said elements, a manually operable rotor mechanism including a depressible arm adapted to engage and move said member and to depress a selected one of said elements so as to bring the selected element into cooperative relation with said stop mechanism, and a switch adapted for connection to said receiver and carried by said rotor mechanism so as to be actuatable by said depressible arm, said switch including a resilient element serving to maintain said arm normally in inoperative position.

13. In a tuning device for a radio receiver or the like, rotatable means adapted to rotate a tuning element of said receiver, a plurality of selectable elements carried by said means and corresponding respectively to different positions of said tuning element, a stop mechanism adapted for cooperation with a selected one of said elements, a rotor, a depressible arm carried by said rotor and adapted to engage said rotatable means and to depress a selected one of said elements, a switch comprising a pair of electrically conductive members carried by said rotor, one of said members being movable by said arm into engagement with the other member, a stationary electrically conductive member adapted for connection to said receiver, and means for effecting and maintaining electrical contact between one of said switch members and said last member during rotation of said rotor.

14. In a tuning device for a radio receiver or the like, a rotatable member adapted to rotate a tuning element of said receiver, said member having a plurality of non-circular openings, a plurality of plunger-like elements each adapted to seat slidably in one of said openings and each element having a portion complemental in shape to its opening, whereby each of said elements may be slidably inserted through its opening with its said portion aligned with the opening and then turned to misalign the said portion and opening, and a stop mechanism adapted for cooperation with a selected one of said elements, whereby said member may be rotated to bring the selected element into cooperative relation with said stop mechanism.

15. In a tuning device for a radio receiver or the like, a rotatable member adapted to rotate a tuning element of said receiver, said member having a plurality of non-circular openings, a plurality of plunger-like elements each adapted to seat slidably in one of said openings and each element having a portion complemental in shape to its opening, whereby each of said elements may be slidably inserted through its opening with its said portion aligned with the opening and then turned to misalign the said portion and opening, said openings and said elements having complemental interdentate surfaces for locking said elements in adjusted position but permitting rotary adjustment of said elements when they are moved to non-locking position, a stop mechanism adapted for cooperation with a selected one of said elements, and manually operable means for selecting one of said elements and for moving said member to bring the selected element into cooperative relation with said stop mechanism.

16. In a tuning device for a radio receiver or the like, a rotatable member adapted to rotate a tuning element of said receiver, said member having a plurality of openings with recesses, a plurality of plunger-like elements each adapted to seat slidably in one of said openings with an end projecting from the opening and each element having a laterally extending arm at its other end conforming with the recess of said opening only when the arm is aligned with the recess, whereby each of said elements may be slidably inserted through its opening with its arm aligned with the recess and then turned to misalign the arm and recess, a stop mechanism adapted for cooperation with the arm of a selected one of said elements, and manually operable means for selecting one of said elements and for moving said member to bring the arm of the selected element into cooperative relation with said stop mechanism.

17. In a tuning device for a radio receiver or the like, a rotatable member adapted to rotate a tuning element of said receiver, said member having a plurality of non-circular openings with recesses, a plurality of plunger-like elements each adapted to seat slidably in one of said openings with an end projecting from the opening and each element having a laterally extending arm at its other end conforming with the recess of said opening, each of said openings and its associated element having complemental interdentate surfaces for locking said element in an adjusted position but permitting rotary adjustment of the element when it is moved to its innermost position, a spring associated with each of said elements and arranged to resist movement of the element to said position and to maintain the element normally in locked position, whereby each of said elements may be slidably inserted through its opening with its arm aligned with the recess and moved slidably to its innermost position against the action of its spring and then turned to misalign the arm and recesss, a stop mechanism adapted for cooperation with the arm of a selected one of said elements, and manually operable means for selecting one of said elements and for moving said member to bring the arm of the selected element into cooperative relation with said stop mechanism.

18. In a tuning device for a radio receiver or the like, rotatable means adapted to rotate a tuning element of said receiver, a plurality of selectable elements carried by said means and corresponding respectively to different positions of said tuning element, a pair of individually depressible gate members with a space therebetween forming a stop mechanism adapted for cooperation with a selected one of said elements, and means for selecting one of said elements and for moving said rotatable means to bring the selected element into engagement with one of said gate members and into said space, to thereby stop said tuning element at a predetermined position corresponding to the selected element.

19. In an adjusting mechanism for radio receivers or the like having a tuning element, a rotary member, a plurality of selectively depressible push buttons carried by said rotary member, stop means for cooperating with a depressed push button to stop said rotary member and the tuning element in the position predetermined by the depressed push button, said stop means comprising spaced, resiliently supported cams for stopping the rotary member in the same position regardless of its direction of rotation.

20. A tuning control mechanism for radio receivers comprising a member operatively connected to a tuning element of said radio receiver, a multiplicity of accessible plungers arranged to actuate said member to a plurality of different positions, and means for mounting the plungers for sliding movement, each plunger terminating in a projecting finger offset from the axis of said plunger, said plungers and said means being provided with a plurality of inter-engaging small serrations extending in a direction to normally prevent rotation of said plungers, the plungers and carrier being relatively movable to a position to disengage the serrations whereby the plungers may be individually rotated to adjust the position of the finger of each plunger.

21. In a dial type tuning control mechanism for radio receivers, in combination, a casing mounted for rotation and operatively connected to a tuning element of said receiver, a multiplicity of plungers arranged peripherally around said casing and projecting therethrough, said plungers terminating in fingers projecting inwardly, a pair of yieldable gates arranged to be entered by said fingers to provide a positive stop against rotation of said casing in either direction, said plungers being slidable longitudinally to a position where said finger enters said gates, and being biased to forward position.

22. In a dial type tuning control mechanism for radio receivers, in combination, a casing mounted for rotation and operatively connected to a tuning element of said receiver, a multiplicity of plungers arranged peripherally around said casing in openings therein and projecting rearwardly therebeyond, and terminating in fingers offset from the axis of said plungers, a pair of yieldable gates arranged to be entered by said fingers to provide a positive stop against rotation of said casing in either direction, said plungers being slidable longitudinally to a position where said finger enters said gates, and biased to forward position, and means for preventing relative rotation of said plungers in said casing during normal tuning operations.

23. In a dial type tuning control mechanism for radio receivers, a carrier mounted for rotation and operatively connected to a tuning element of said receiver, a multiplicity of plungers arranged peripherally around said carrier for sliding movement therein, each plunger terminating in a finger offset from the axis of the plunger and projecting rearwardly of said carrier, means mounted to be engaged by said fingers to provide a positive stop against rotation of said carrier in either direction, said plungers and said carrier being provided with a multiplicity of inter-engaging small serrations extending longitudinally of said plungers for preventing rotation thereof, the plungers and carrier being relatively movable to a position to disengage the serrations whereby the plungers may be individually rotated to adjust the position of the finger of each plunger.

24. In a tuning device for a radio receiver, a plurality of selectively operable elements each normally disposed in inoperative position but adapted to be moved to operative position, a gate mechanism arranged for cooperation with an operated one of said elements, said gate mechanism comprising a pair of latch members with a space therebetween to receive an operated one of said elements, means for effecting relative movement between said elements and said gate mechanism, and means for adjusting the tuning of said receiver according to such relative movement, said movement causing an operated one of said elements to engage one of said latch members and enter said space, thereby to terminate the tuning adjustment.

25. In a tuning device for a radio receiver, a plurality of selectively operable elements each normally disposed in inoperative position but adapted to be moved to operative position, a gate mechanism arranged for cooperation with an operated one of said elements, said gate mechanism comprising a pair of latch members with a space therebetween to receive an operated one of said elements, means for effecting relative movement between said elements and said gate mechanism, means for adjusting the tuning of said receiver according to such relative movement, said movement causing an operated one of said elements to engage one of said latch members and enter said space, thereby to terminate the tuning adjustment, and a switch associated with said gate mechanism and operable to perform a circuit control function when the operated element engages the gate mechanism.

26. In a tuning device for a radio receiver or the like, rotatable means adapted to rotate a tuning element of said receiver, a plurality of selectable spring-pressed elements carried by said means and corresponding respectively to different positions of said tuning element, a pair of individually depressible gate members with a space therebetween forming a stop mechanism adapted for cooperation with a selected one of said elements, said elements adapted to be selectively depressed and rotated into engagement with one of said gate members and into said space, and switching means operable simultaneously with said elements to render said receiver inoperative during the tuning thereof.

LEO B. GLASER.
JOHN M. BOWMAN.
JOSEPH A. BRIGGS.